S. B. SCHORY.
WHEEL TIRE.
APPLICATION FILED FEB. 8, 1917.
1,250,672.
Patented Dec. 18, 1917.
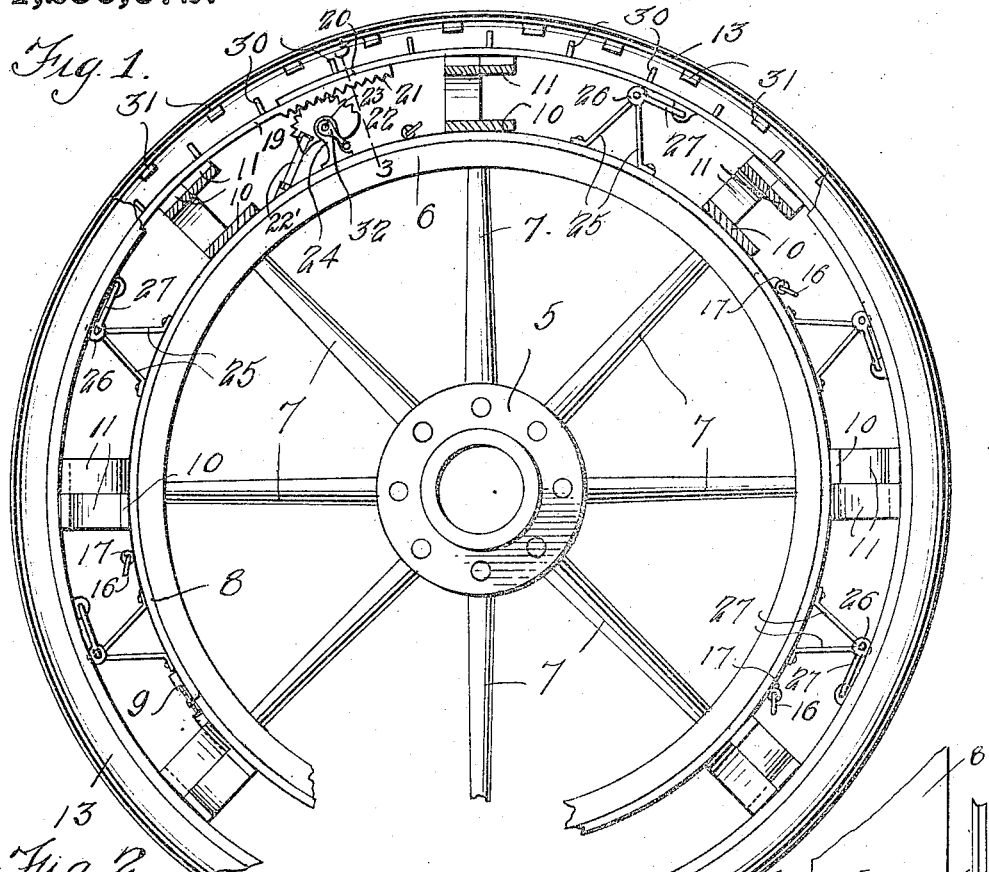
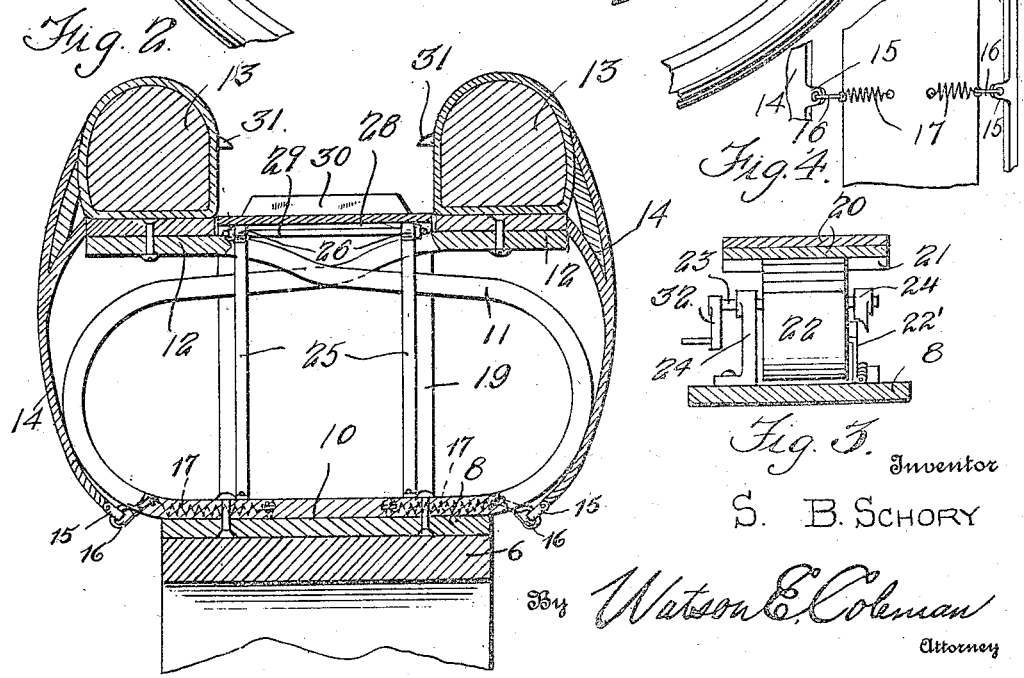
Inventor
S. B. SCHORY
By Watson E. Coleman
Attorney

UNITED STATES PATENT OFFICE.

SAMUEL B. SCHORY, OF NEW WATERFORD, OHIO.

WHEEL-TIRE.

1,250,672.  Specification of Letters Patent.  Patented Dec. 18, 1917.

Application filed February 8, 1917. Serial No. 147,398.

*To all whom it may concern:*

Be it known that I, SAMUEL B. SCHORY, a citizen of the United States, residing at New Waterford, in the county of Columbiana and State of Ohio, have invented certain new and useful Improvements in Wheel-Tires, of which the following is a specification, reference being had to the accompanying drawings.

This invention relates to an improved wheel tire and has for its primary object to provide a tire of simple and durable construction to be employed in lieu of the ordinary pneumatic tire which is not susceptible to puncture and which will provide means for completely absorbing road shocks or jars and obviating their transmission through the wheel axle to the body of the vehicle.

It is also an important object of the invention to provide annular tread members yieldably supported in spaced relation to the wheel felly, and an annular, expansible mud band arranged between said tread members.

It is also one of the detail objects of the invention to provide a split, metallic felly band and means for detachably clamping the same upon the periphery of the wheel felly, spaced members fixed upon said band and having oppositely projecting, spring arms, and spaced, annular tread members secured upon the terminals of the corresponding spring arms.

It is a further general object of the invention to improve and simplify wheel tires of the above type, whereby the same are rendered highly efficient and serviceable in operation and capable of manufacture at relatively small cost.

With the above and other objects in view, my invention consists in the novel features of construction, combination, and arrangement of parts to be hereinafter more fully described, claimed and illustrated in the accompanying drawing, in which, Figure 1 is a side elevation, partly in section, the casing being removed showing a wheel provided with my improved resilient tire;

Fig. 2 is an enlarged transverse section;

Fig. 3 is a section taken on the line 3—3 of Fig. 1; and

Fig. 4 is a detail plan view showing the means for yieldably and detachably connecting the flexible side walls of the tire to the felly band.

Referring in detail to the drawing, 5 designates the hub, 6 the felly, and 7 the connecting spokes of the wheel. Upon the wheel felly, an annular, metal band 8 is engaged, said band being split and the ends thereof connected by a clamping bolt or screw 9. The opposite end portions of the bolt are oppositely threaded and engaged in threaded sockets in the ends of the band whereby said ends of the band can be drawn together and the band 8 tightly clamped upon the felly of the wheel.

Upon the face of the felly band 8, at spaced points, the plates 10 are riveted or otherwise securely fixed. Each of these plates is provided with relatively narrow, outwardly and upwardly curved spring arms 11, each of the arms being of a width substantially equal to one-half of the width of the plate 10. The end portions of the arms 11 are extended past each other in intersecting relation, as clearly seen in Fig. 2 of the drawing, and upon the horizontally disposed terminals 12 of these arms, the annular tread members 13 are fixed in any suitable manner. Each of these tread members is preferably of solid rubber and has a straight inner side wall or face. Outer flexible walls 14 are secured by rivets or other suitable means at one of their edges to the annular tread members 13, and upon their other or inner edges are provided with eyes 15 for engagement in the snap hooks 16 connected to one end of the springs 17. The inner ends of these springs are flattened and riveted to the outer face of the felly band 8.

19 designates a metal mud band or ring which is split and has overlapping end portions indicated at 20. The innermost end portion of this band is provided upon its inner face with teeth 21 for engagement by a toothed cam member 22 which is fixed upon a rod or shaft 23 rotatably mounted in spaced supports or standards 24 fixed to the felly band 8. 22' indicates a pivoted latch member mounted upon the band 8, adapted for engagement at its free end with the shoulder on one face of the cam 22 to hold said cam against reverse rotation after the band 19 has been expanded.

Upon the band 8 between the plates 10 thereon, the inverted, V-shaped supports 25 are fixed at their extremities, said supports being arranged in pairs and having bearing sleeves or knuckles 26 on their upper ends. A U-shaped rod 27 has its intermediate portion rotatably engaged in the sleeves or eyes 28 fixed to the under side of the band 19. The angular end portions of said rod are provided with openings to receive the bolt 29 which extends through the bearing sleeves 26 on the supports 25. The band 19 may be provided upon its outer face with spaced, transverse cleats 30, and to the inner opposed faces of the tread members 13, spaced stop lugs 31 are secured to limit the outward movement of the band 19.

To one end of the shaft 23, a crank indicated at 32 is adapted to be applied, whereby said shaft may be rotated. Upon the rotation of the toothed cam 22 which engages with the teeth 21 on one end of the band 19, said band is expanded, the U-shaped rods 27 being lifted or moved outwardly upon the supports 25 to radial position, as the diameter of the band increases. The mud band having the cleats 30 thereon is thus distended between the tread members 13 so as to secure a firm contact or gripping engagement upon muddy road surfaces, whereby the necessary tractive force is obtained for the propulsion of the vehicle. The tire structure as a whole will, at the same time, yield to excessive pressures both when the mud band is distended in an operative position or when this band is in its inoperative position as seen in the drawing.

From the foregoing description, taken in connection with the accompanying drawing, the construction and manner of operation of the device will be clearly and fully understood. By the use of my improved wheel tire, expense and delays incident to punctures and blow-outs as is a common occurrence in the use of the pneumatic tire, are avoided, and by the provision of the spaced, relatively narrow treads, skidding or slipping of the wheel is, to a great extent, eliminated. These tread members may be yieldably supported or cushioned at a plurality of spaced points and will completely absorb all shocks or jars so that they are not transmitted to the body of the vehicle. My improved wheel tire is also exceedingly strong and durable in its construction, and as it consists of relatively few elements which are all of simple form, the device can manifestly be manufactured at comparatively small cost.

While I have shown and described the preferred construction and arrangement of the several parts, it is to be understood that the device is susceptible of considerable modification therein and I, therefore, reserve the privilege of adopting all such legitimate changes as may be fairly embodied within the spirit and scope of the invention as claimed.

Having thus fully described my invention, what I desire to claim and secure by Letters Patent is:

1. A wheel tire including a felly band, spaced annular tread members, means disposed between the tread members and the felly band and yieldably supporting the tread members in concentric relation to the felly band, an expansible mud band arranged between the tread members, and manually operable means mounted upon the felly band and co-acting with the mud band to expand the same.

2. A wheel tire including a felly band, spaced annular tread members, means disposed between the felly band and the tread members and yieldably supporting the tread members in spaced concentric relation to the felly band, a split mud band arranged between the tread members and having overlapping end portions, a rotatable cam member mounted upon the felly band and co-acting with one end of the mud band to expand the latter, and means for holding said cam member against rotation.

3. A wheel tire including a felly band, spaced annular tread members, means disposed between the felly band and the tread members and yieldably supporting the tread members in spaced, concentric relation to the felly band, a split mud band arranged between the tread members and having overlapping end portions, a plurality of supporting members pivotally mounted upon the felly band and connected to the mud band and extending radially of the wheel when the mud band is expanded, and manually operable means mounted upon the felly band and co-acting with one end of the mud band to expand the same between the tread members.

In testimony whereof I hereunto affix my signature in the presence of two witnesses.

SAMUEL B. SCHORY.

Witnesses:
WM. DISHONG,
W. O. WALLACE.